United States Patent
Lam

[19]

[11] Patent Number: 6,052,461
[45] Date of Patent: Apr. 18, 2000

[54] METHOD AND APPARATUS FOR MAINTAINING REAL-TIME BUSY STATUS INFORMATION OF TELEPHONE EXTENSIONS IN A PRIVATE BRANCH EXCHANGE

[75] Inventor: Cory Lam, Hacienda Heights, Calif.

[73] Assignee: Ericsson Inc., Research Triangle Park, N.C.

[21] Appl. No.: 08/895,855

[22] Filed: Jul. 17, 1997

[51] Int. Cl.[7] .............................. H04M 3/00; H04M 3/42; H04M 7/00
[52] U.S. Cl. ........................ 379/297; 379/201; 379/229
[58] Field of Search ................................... 379/211, 142, 379/112, 265, 201, 229, 266, 297

[56] References Cited

U.S. PATENT DOCUMENTS

| | | | |
|---|---|---|---|
| 5,410,754 | 4/1995 | Klotzbach et al. | 370/85.13 |
| 5,621,789 | 4/1997 | McCalmont et al. | 379/265 |
| 5,703,941 | 12/1997 | Nakajima et al. | 379/201 |
| 5,742,675 | 4/1998 | Kilander et al. | 379/265 |
| 5,841,854 | 11/1998 | Schumacher et al. | 379/265 |

FOREIGN PATENT DOCUMENTS

| | | |
|---|---|---|
| 0 592 963 | 4/1994 | European Pat. Off. . |
| 0 847 176 | 6/1998 | European Pat. Off. . |
| 1006352 | 9/1997 | Netherlands . |
| WO 97146955 | 12/1997 | WIPO . |

OTHER PUBLICATIONS

PCT International Search Report, Dec. 11, 1998, PCT/US 98/14762.

Primary Examiner—Harry S. Hong
Attorney, Agent, or Firm—Jenkens & Gilchrist, P.C.

[57] ABSTRACT

A method and apparatus for maintaining real-time busy status information for a plurality of telephone extensions connected to a Private Branch Exchange (PBX). The invention includes a database for storing busy status information obtained by a server from signaling information generated by the PBX. The signaling information is obtained via a communication link connecting the PBX and the server. The present invention further includes an interface adapter for converting the protocol of the signaling information into a protocol suitable for storing the busy status information in the database by the server.

20 Claims, 3 Drawing Sheets

METHOD AND APPARATUS FOR MAINTAINING REAL-TIME BUSY STATUS INFORMATION OF TELEPHONE EXTENSIONS IN A PRIVATE BRANCH EXCHANGE

BACKGROUND OF THE INVENTION

1. Technical Field of the Invention

The present invention pertains in general to an apparatus for maintaining real-time busy status information in a telephone network, and more particularly, to a method and apparatus for maintaining real time busy status information for a plurality of telephone extensions in a private branch exchange.

2. Description of Related Art

In the small Private Branch Exchange (PBX) market, an operator station typically includes a "busy lamp field" display for displaying busy status information of all telephone extensions connected to the PBX. The display includes green and red light emitting diodes to indicate whether a particular extension is on-hook or off-hook. The display allows an operator to determine whether the telephone extension is currently engaged in a conversation when attempting to connect a caller to the telephone extension. As the number of telephone extensions supported by the PBX grows, however, implementing the busy lamp field display becomes infeasible due to physical limitations in placing the large number of extension indicators on the display panel. Nevertheless, there remains a demand in the marketplace to provide the busy lamp field functionality. Furthermore, in the computer telephony area there is also a demand to provide busy lamp field functionality to other telephone extensions supported by the PBX such that subscribers do not attempt to place a call to telephone extensions which are already busy.

It would be advantageous therefore, to devise a method and apparatus which provides busy lamp field functionality to both an operator station and to subscribers supported by the PBX regardless of the total number of telephone extensions supported by the PBX.

SUMMARY OF THE INVENTION

The present invention comprises an method and apparatus for maintaining real-time busy status information for a plurality of telephone extensions connected to a Private Branch Exchange (PBX). The invention includes a database for storing busy status information obtained by a server from signaling information generated by the PBX. The signaling information is obtained via a communication link connecting the PBX and the server. The present invention further includes an interface adapter for converting the protocol of the signaling information into a protocol suitable for storing the busy status information in the database by the server.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
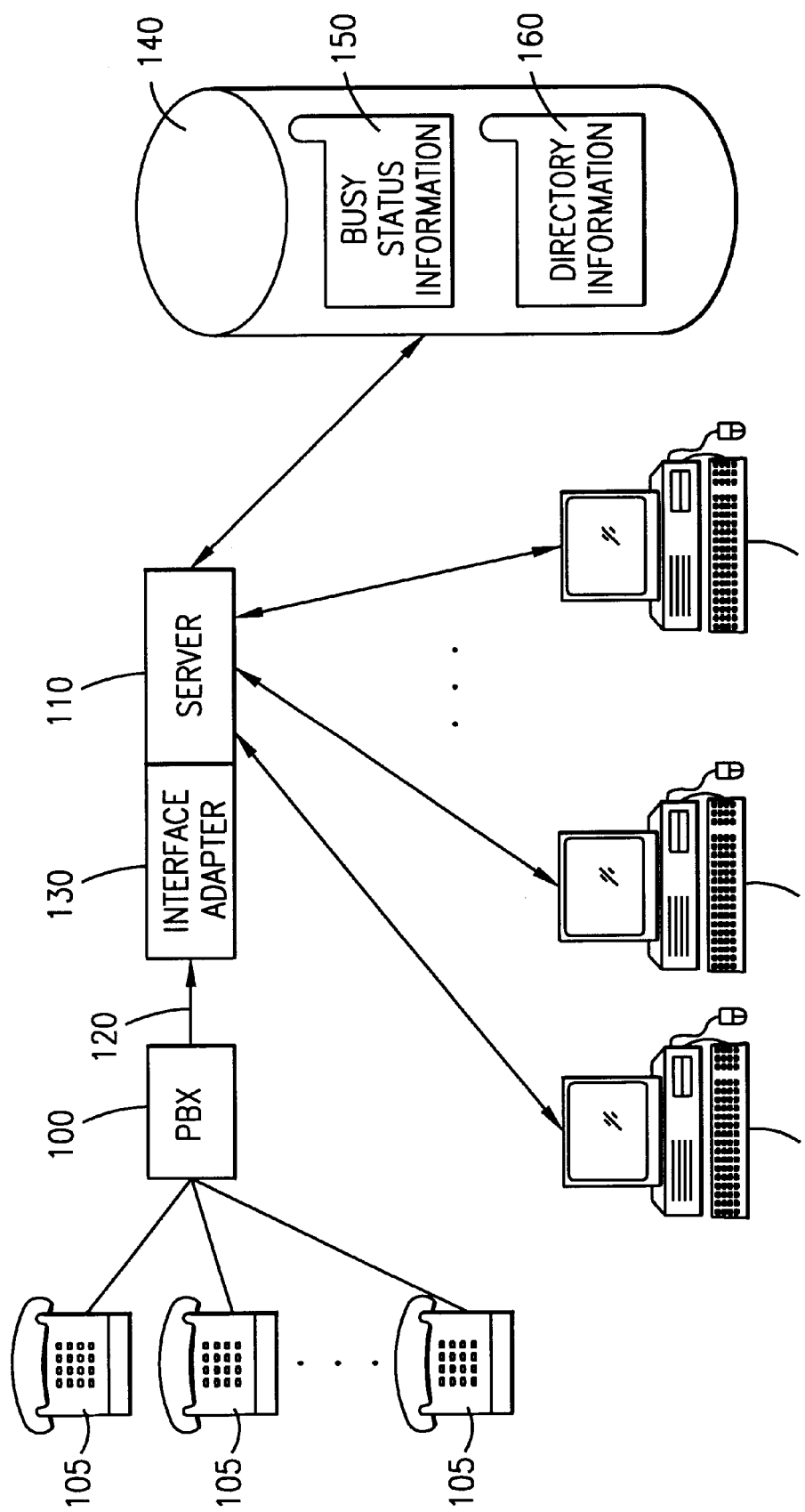
FIG. 1 is a functional block diagram of a preferred embodiment of the present invention.

Referring now to FIG. 1, there is illustrated a functional block diagram of a preferred embodiment of the present invention. A Private Branch Exchange (PBX) 100, serving a plurality of telephone extensions 105, is connected to a server 110 via a communications link 120 and an interface adapter 130. The server 110 communicates with a database 140 containing busy status information 150 and directory information 160. The directory information 160 contains information regarding subscribers connected to the PBX 100 such as a name director and corresponding telephone extension numbers. The server 110 also communicates with a plurality of terminals 170 including an operator station 180.

When one of the telephone extensions 105 goes off-hook or on-hook, the PBX 100 generates signaling information indicative of the transition. The signaling information is communicated to the server 110 via the communication link 120. Any type of communication link 120 can be used, however, in the preferred embodiment the link is effectuated using a Transport Control Protocol/Internet Protocol(TCP/IP) link. In the event that the protocol used by the PBX 100 to generate the signaling information is incompatible with the protocol used by the server 110 and the database 140, an interface adapter 130 converts the signaling information to a protocol suitable for use by the server 110. For example, the interface adapter 130 can be used to convert proprietary signaling information of an Ericsson MD 110 PBX to standard Computer Supported Telecommunications Application (CSTA) protocol for processing by the server 110.

Upon receiving notification of a transition to an onhook or off-hook state, the server 110 updates the busy status information 150 contained in database 140. The busy status information 150 can be maintained independently, or alternatively, can be stored together with the directory information 160. If the busy status information 150 is stored together with the directory information 160, the busy status of subscribers can be determined when searching directory information 160. The busy status information 150 associated with each telephone extension 105 may also be assigned different colors such as red and green and/or various icon designs with the particular color or icon design representative of the current busy status of the particular telephone extension 105.

The server 110 also communicates with various terminals 170 and an operator station 180. Communication can be effectuated over any communication network such as direct connections or via a local area network. In the preferred embodiment, terminals 170 and operator station 180 are personal computers, however, they may also be a desk top application running on other computing devices. The server 110 retrieves from the database 140 and broadcasts busy status information 150 to terminals 170 which are subscribers of real-time notification and the operator station 180, or alternatively, the busy status information 150 can be retrieved and transmitted in response to a request from the terminals 170 or operator station 180.

Figure 2:
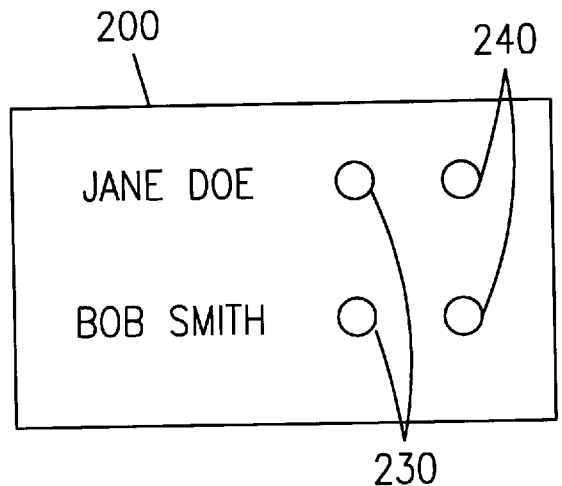
FIG. 2 depicts three display screens illustrating three formats for displaying busy status information.
Figure 2:
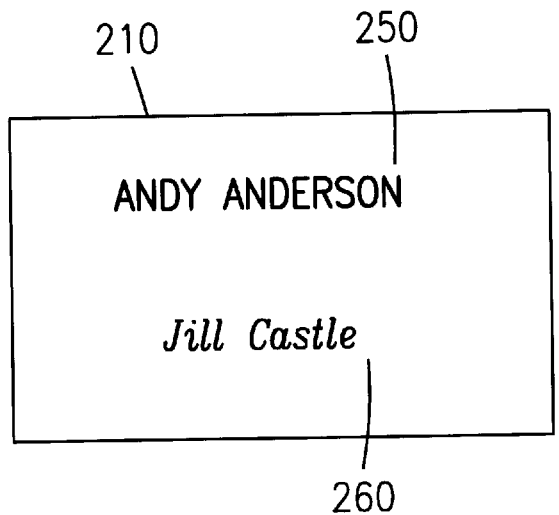
Figure 2:
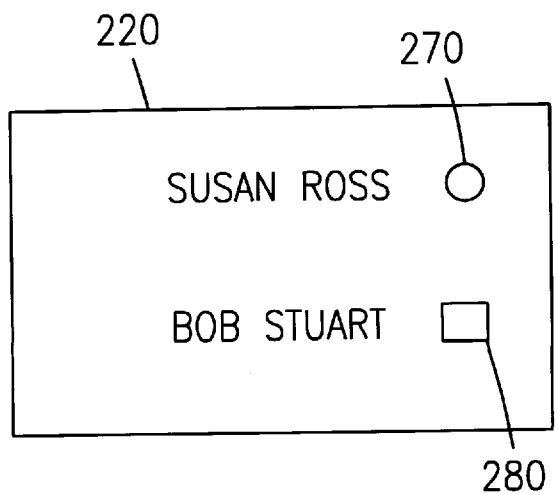

Referring additionally now to FIG. 2, there is illustrated a first display screen 200, a second display screen 210, and a third display screen 220 which can be connected to either the terminals 170 or the operator station 180. The busy status information 150 can be displayed in any format by the terminals 170 and operator station 180. For example, the first screen 200 is programed to resemble a busy lamp field display including a red indicator 230 and a green indicator 240. When the particular extension is on-hook the red indicator 230 is illuminated and when the extension is off-hook the green indicator 240 is illuminated.

In the second display screen 210, the names of the subscribers associated with each telephone extension is listed in a directory. If the particular extension is onhook the name of the subscriber is colored in red as is illustrated in the Fig. 2 by the bold lettering 250. If the particular extension is off-hook the name of the subscriber is colored in green as is illustrated by italic lettering 260.

In a third display screen 220, an icon is used to indicate the busy status of the extensions. If the particular extension is on-hook a first icon 270 is located next to the name of the subscriber. If the particular extension is off-hook a second icon 280 is located next to the name of the subscriber.

Figure 3:
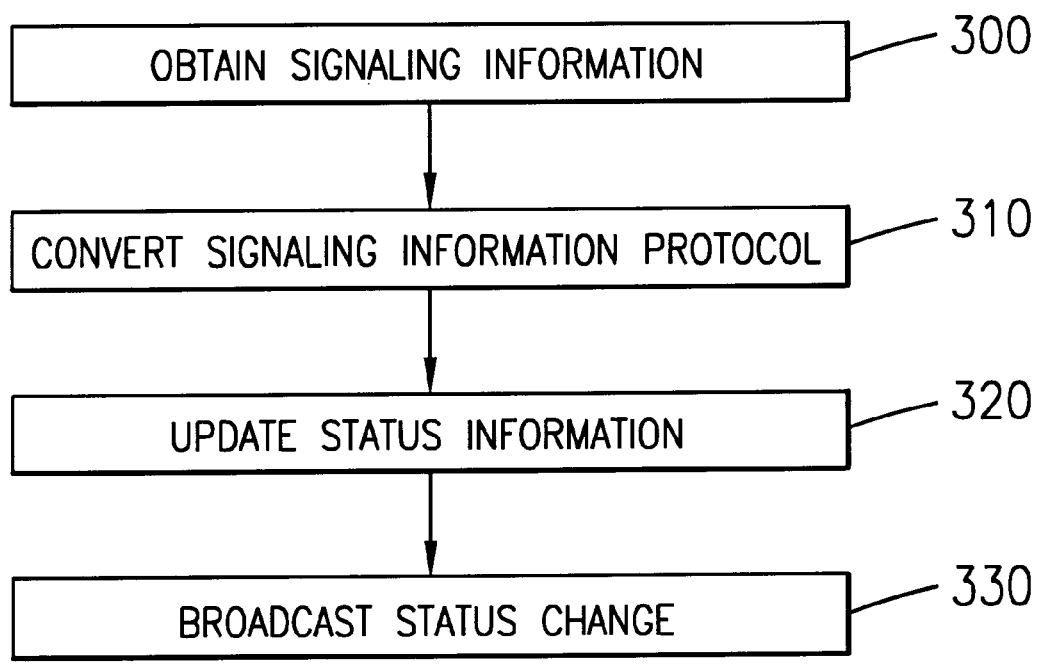
FIG. 3 is a flow diagram of a method for implementing the preferred embodiment of the present invention described in FIG. 1.

Referring additionally now to FIG. 3, there is illustrated a flow diagram of a method for implementing the preferred embodiment of the present invention described in FIG. 1. The server 110 obtains signaling information (step 300) generated by the private branch exchange 100, the signaling information being indicative of a change in the status of a telephone extension 105. In certain situations where the protocol of the signaling information generated by the private branch exchange 100 differs from the protocol used by the server 110, the interface adapter 130 converts the protocol of the signaling information (step 310) from the protocol used by the private branch exchange 100 to the protocol used by the server 110. After obtaining the signaling information, the server 110 updates status information 150 (step 320) contained in the data base 140. The server 110 also broadcasts changes in the status of telephone extensions 105 (step 330) to subscribers of realtime notification.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. An apparatus for maintaining real-time busy status information for a plurality of telephone extensions of a private branch exchange comprising:
    a database for storing busy status information for the plurality of telephone extensions coupled to the private branch exchange;
    a server for obtaining signaling information generated by the private branch exchange with respect to private branch exchange telephone extension status, accessing of the database and updating in the database of the busy status information in response to the signaling information; and
    a communication link connecting the private branch exchange to the server, the communication link further for effectuating communication between the server and the private branch exchange.

2. The apparatus recited in claim 1, wherein the communication link further includes an interface adapter for converting the signaling information from a protocol used by the private branch exchange into a protocol used by the server.

3. The apparatus related in claim 2, wherein the interface adaptor converts signaling information of the private branch exchange into standard Computer Supported Telecommunications Application protocol.

4. The apparatus recited in claim 3, wherein the communication link is a transport control protocol /Internet Protocol link.

5. The apparatus recited in claim 1, wherein the busy status information is stored in conjunction with directory information.

6. The apparatus recited in claim 1, wherein the server further operates by retrieving the busy status information from the database and broadcasting the busy status information in real time to a user terminal.

7. The apparatus of claim 1, wherein the server further operates by retrieving the busy status information from the database and communicating the busy status information to a user terminal at the request of the user terminal.

8. The apparatus recited in claim 1, wherein the busy status information is displayed on a user terminal using a color indicative of the current status of the telephone extension.

9. The apparatus recited in claim 1, wherein the busy status information is displayed on a user terminal using an icon indicative of the current status of the telephone extension.

10. A method for maintaining real-time busy status information for a plurality of telephone extensions of a private branch exchange comprising the steps of:
    obtaining from the private branch exchange signaling information generated therefrom that is indicative of a change in busy status of a telephone extension coupled to the private branch exchange; end
    updating busy status information for the telephone extension stored in a database.

11. The method recited in claim 10, further comprising the step of converting the signaling information from one protocol to another protocol.

12. The method recited in claim 11, further comprising the step of broadcasting changes in the busy status information for the telephone extension to at least one subscriber of real-time notification.

13. A system for maintaining real-time on-hook/off-hook status information for a plurality of telephone extensions coupled to a private branch exchange, the system comprising:
    a private branch exchange for generating on-hook/off-hook signaling information for the coupled to plurality of telephone extensions;
    a database for storing on-hook/off-hook status information for the plurality of telephone extensions; and
    a server connected to the private branch exchange and the database and operable to receive the on-hook/off-hook signaling information generated by the private branch exchange, access the database, and update the on-hook/off-hook status information for the telephone extensions coupled to the private branch exchange stored in the database in response to the received signaling information.

14. The system of claim 13, wherein the server is connected to the private branch exchange via an interface adapter for converting the on-hook/off-hook signaling information from a protocol used by the private branch exchange into a protocol used by the server.

15. The system of claim 14, wherein the interface adapter converts the on-hook/off-hook signaling information of the private branch exchange into standard Computer Supported Telecommunications Application protocol.

16. The system of claim 13, wherein the server is connected to the private branch exchange via a transport control protocol/Internet Protocol communication link.

17. The system of claim 13, wherein the on-hook/off-hook status information is stored in conjunction with directory information.

18. The system of claim 13, wherein the server further operates to retrieve the on-hook/off-hook status information from the database and broadcast the on-hook/off-hook status information of each of the plurality of telephone extensions to at least two user terminals.

19. The system of claim 13, wherein the server further operates to retrieve the on-hook/off-hook status information from the database and communicate the on-hook/off-hook status information to a user terminal in response to a request from the user terminal.

20. The system of claim 13, wherein the on-hook/off-hook status information is displayed on a user terminal using a color indicator indicative of the current on-hook/off-hook status of the plurality of telephone extensions.

* * * * *

UNITED STATES PATENT AND TRADEMARK OFFICE
CERTIFICATE OF CORRECTION

PATENT NO.    : 6,052,461
DATED         : April 18, 2000
INVENTOR(S)   : Lam

It is certified that error appears in the above-identified patent and that said Letters Patent is hereby corrected as shown below:

Column 2,
Line 32, replace "onhook" with -- on-hook --

Column 3,
Line 5, replace "onhook" with -- on-hook --
Line 30, replace "realtime" with -- real-time --

Signed and Sealed this

Twenty-second Day of April, 2003

JAMES E. ROGAN
*Director of the United States Patent and Trademark Office*